(12) United States Patent
Yu et al.

(10) Patent No.: US 9,912,500 B2
(45) Date of Patent: Mar. 6, 2018

(54) ADAPTIVE PRE-EQUALIZATION IN OPTICAL COMMUNICATIONS

(71) Applicant: ZTE Corporation, Shenzhen (CN)

(72) Inventors: Jianjun Yu, Basking Ridge, NJ (US); Hung-Chang Chien, Bridgewater, NJ (US); Junwen Zhang, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/034,177

(22) PCT Filed: Oct. 31, 2014

(86) PCT No.: PCT/CN2014/090057
§ 371 (c)(1),
(2) Date: May 3, 2016

(87) PCT Pub. No.: WO2015/062544
PCT Pub. Date: May 7, 2015

(65) Prior Publication Data
US 2016/0285657 A1 Sep. 29, 2016

Related U.S. Application Data

(60) Provisional application No. 61/899,733, filed on Nov. 4, 2013.

(51) Int. Cl.
H04B 10/06 (2006.01)
H04L 25/03 (2006.01)
(Continued)

(52) U.S. Cl.
CPC ... *H04L 25/03343* (2013.01); *H04B 10/0799* (2013.01); *H04B 10/616* (2013.01); *H04J 14/06* (2013.01); *H04L 7/0075* (2013.01)

(58) Field of Classification Search
CPC .... H04B 10/616; H04B 10/613; H04B 10/60; H04B 10/6162; H04B 10/6166;
(Continued)

(56) References Cited

U.S. PATENT DOCUMENTS 7,747,172 B2 *  6/2010  Hayee ............... H04B 10/6971
                                                    398/149
8,478,131 B2 *  7/2013  Hayee ............... H04B 10/6971
                                                    398/149
(Continued)

FOREIGN PATENT DOCUMENTS

CN     102014089 A    4/2011
CN     102301719 A    12/2011
(Continued)

OTHER PUBLICATIONS

Bosco, G., et al., "On the Performance of Nyquist-WDM Terabit Superchannels Based on PM-BPSK, PM-QPSK, PM-8QAM or PM-16QAM Subcarriers," Journal of Lightwave Technology, 29(1):53-61, Jan. 2011.

(Continued)

*Primary Examiner* — Hibret Woldekidan
(74) *Attorney, Agent, or Firm* — Perkins Coie LLP

(57) ABSTRACT

The filter estimate produced by post-equalization processing of an optical signal at a receiver is used to generate pre-equalizer filter coefficients that are communicated back to the source of the optical signal for performing pre-equalization. In one advantageous aspect, the already existing post-equalization modules of an optical receive equipment can thus be used to produce, in addition, a pre-equalizer filter for use by the source side.

15 Claims, 7 Drawing Sheets

(51) Int. Cl.
*H04B 10/079* (2013.01)
*H04B 10/61* (2013.01)
*H04J 14/06* (2006.01)
*H04L 7/00* (2006.01)

(58) Field of Classification Search
CPC .............. H04B 10/0799; H04J 14/06; H04L 25/03343; H04L 7/0075
USPC .......... 398/65, 149, 202, 205, 206, 208, 209
See application file for complete search history.

(56) References Cited

U.S. PATENT DOCUMENTS

| | | | | |
|---|---|---|---|---|
| 8,526,823 | B2* | 9/2013 | Swanson | H04B 10/0795 398/136 |
| 8,693,898 | B2* | 4/2014 | Koizumi | H04B 10/613 375/229 |
| 9,160,459 | B2* | 10/2015 | Arikawa | H04B 10/616 |
| 9,270,513 | B2* | 2/2016 | Yu | H04L 27/3818 |
| 2002/0085118 | A1* | 7/2002 | Harris | H04H 20/31 348/473 |
| 2006/0007998 | A1 | 1/2006 | Luo et al. | |
| 2007/0253476 | A1* | 11/2007 | Tirkkonen | H04L 1/06 375/230 |
| 2011/0150503 | A1* | 6/2011 | Winzer | H04B 10/60 398/202 |
| 2011/0255602 | A1 | 10/2011 | Kondo et al. | |
| 2012/0087434 | A1 | 4/2012 | Kent et al. | |
| 2012/0275797 | A1* | 11/2012 | Li | H04B 10/2519 398/152 |
| 2013/0136451 | A1* | 5/2013 | Yoshida | H04B 10/532 398/65 |
| 2013/0216239 | A1* | 8/2013 | Zhang | H04B 10/613 398/202 |
| 2014/0086594 | A1* | 3/2014 | Xie | H04B 10/6161 398/208 |
| 2014/0147117 | A1* | 5/2014 | Kikuchi | H04B 10/2507 398/65 |
| 2015/0093118 | A1* | 4/2015 | Jia | H04B 10/0779 398/140 |
| 2015/0270921 | A1* | 9/2015 | Jia | H04B 10/6165 398/25 |
| 2016/0099782 | A1* | 4/2016 | Kuang | H04B 10/25133 398/136 |
| 2016/0204822 | A1* | 7/2016 | Yu | H04B 1/40 375/219 |
| 2016/0277175 | A1* | 9/2016 | Lyubomirsky | H04L 7/0075 |
| 2017/0163350 | A1* | 6/2017 | Chien | H04B 10/6162 |
| 2017/0170993 | A1* | 6/2017 | Jia | H04L 25/03006 |
| 2017/0180055 | A1* | 6/2017 | Yu | H04B 10/612 |

FOREIGN PATENT DOCUMENTS

| | | |
|---|---|---|
| EP | 2 645 599 A1 | 10/2013 |
| JP | 04-169974 A | 6/1992 |
| JP | 2007-527630 A | 9/2007 |
| WO | 2004/036857 A1 | 4/2004 |

OTHER PUBLICATIONS

Dong, Z., et al., "6×128-Gb/s Nyquist-WDM PDM-16QAM Generation and Transmission Over 1200-km SMF-28 With SE of 7.47 b/s/Hz," Journal of Lightwave Technology, 30(24):4000-4005, Dec. 2012.

Dong, Z., et al., "6×144-Gb/s Nyquist-WDM PDM-64QAM Generation and Transmission on a 12-GHz WDM Grid equipped With Nyquist-Band Pre-Equalization," Journal of Lightwave Technology, 30(23):3687-3692, Dec. 2012.

International Search Report and Written Opinion dated Jan. 28, 2015 for International Application No. PCT/CN2014/090057, filed on Oct. 31, 2014 (7 pages).

Japanese Office Action dated Aug. 29, 2017 for Japanese Patent Application No. 2016-550927, filed on Oct. 31, 2014 (6 pages).

Zhou, X., et al., "64-Tb/s, 8 b/s/Hz, PDM-36QAM Transmission Over 320 km Using Both Pre- and Post-Transmission Digital Signal Processing," Journal of Lightwave Technology, 29(4):571-577, Feb. 2011.

Zhou, X., et al., "8-450-Gb/s, 50-GHz-Spaced, PDM-32QAM transmission over 400km and one 50GHz-grid ROADM," Optical Fiber Communication Conference/National Fiber Optic Engineers Conference 2011, OSA Technical Digest (CD) (Optical Society of America, 2011), Los Angeles, California, USA, Paper PDPB3, pp. 1-3, Mar. 2011.

Zhou, X., et al., "High Spectral Efficiency 400 Gb/s Transmission Using PDM Time-Domain Hybrid 32-64 QAM and Training-Assisted Carrier Recovery," Journal of Lightwave Technology, 31(7):999-1005, Apr. 2013.

* cited by examiner

ADAPTIVE PRE-EQUALIZATION IN OPTICAL COMMUNICATIONS

CROSS REFERENCE TO RELATED APPLICATIONS

This patent document claims the benefit of U.S. Provisional Patent Application No. 61/899,733, filed on Nov. 4, 2013. The entire content of the before-mentioned patent application is incorporated by reference herein.

BACKGROUND

This patent document relates to digital communication, and, in one aspect, multi-carrier optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which operational and capital expenditure can be reduced.

SUMMARY

The present document discloses techniques for using pre-equalization in optical data transmission. Results from an existing post-equalization processing module in an optical receiver are used to derive a pre-equalizer filter estimate at the receiver side. The derived pre-equalizer filter is communicated to the source-side, where it can be used for performing pre-equalization of data transmissions.

In one aspect, a method of optical communication, implementable at a receiver-side in an optical communication network is disclosed. The method includes receiving a polarization multiplexed optical transmission, demultiplexing the received optical transmission to recover an optical signal comprising modulated data bits performing a post-equalization processing on the received optical signal using a decision directed least means square algorithm thereby estimating a set of filter coefficients representative of a communication channel over which the optical signal is received, deriving a pre-equalizer filter description from the set of filter coefficients, and communicating the pre-equalizer filter to a source of the optical signal.

In another aspect an apparatus for receiving optical signals is disclosed. The apparatus includes a receiver module that receives an optical transmission, a polarization demultiplexing module that polarization demultiplexes a modulated optical signal from the optical transmission, a clock recovery module that extracts a data clock from the received optical signal, a pre-convergence module that processes an output of the clock recovery module to produce an intermediate signal, a decision directed updating module that adaptively estimates a channel transfer function from the intermediate signal and a priori knowledge of a modulation format used for the optical signal, and a pre-equalizer module that computers a pre-equalization filter based on the estimated channel transfer function.

These, and other aspects, are disclosed in the present document.

DETAILED DESCRIPTION

Figure 1:
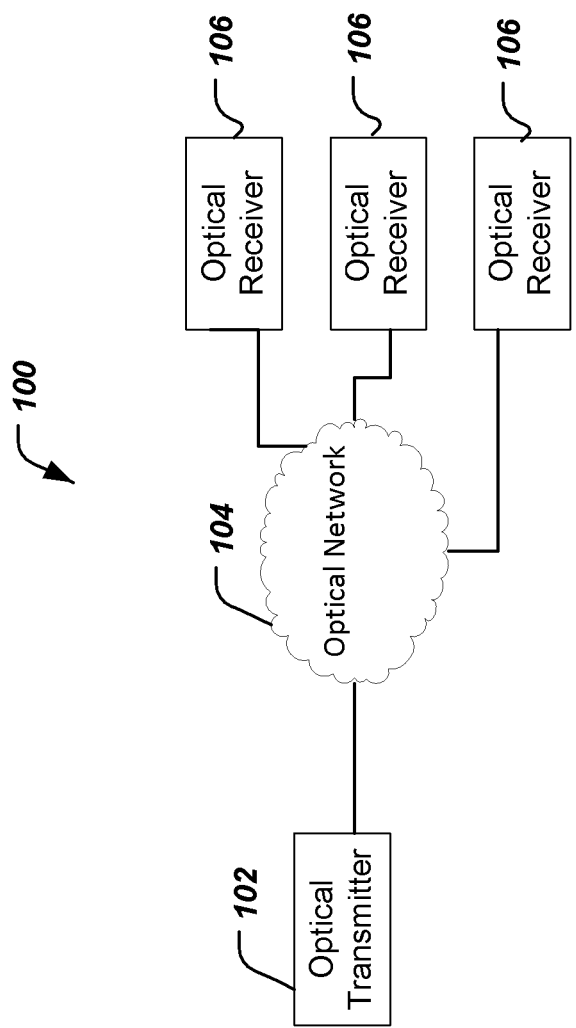
FIG. 1 shows an exemplary optical communication system.

With advances in high speed digital-to-analog converter (DAC) technology, signal generation based on DAC is an attractive method due to the simple configuration and flexible signal generation capability and it has been attracting a great deal of interest in recent years for the transmission of 100 G and beyond. The use of DAC for signal generation benefits an implementation such as software-defined optics (SDO) with arbitrary waveform generation, which can be used for signal software switch in different modulation formats. Further, it also lends itself to digital signal processing in the transmitter side with pre-compensation or pre-equalizations. In order to achieve high speed signal generation, the industrial research communities have made great effort to increase the bandwidth and sample rate of DAC.

However, for existing available DACs, the bandwidth for signal generation is much less than the half of sample rate, which means that the generated signals may suffer the distortions caused by the bandwidth limitation. Further distortions may be caused by other opto-electronic devices, such as the electrical driver and modulator, in region beyond their specified bandwidth in the form of suppressing the signal spectrum. Due to the bandwidth limitation and filtering effect, the system performance may be degraded by inter-symbol interference (ISI), noise enhancement and inter-channel crosstalk. Therefore, pre-equalizations are generally carried out in the Tx side DS for high speed signals generation when using DAC processing. In some systems, a frequency domain equalization may be carried out to pre-equalize the linear band-limiting effects. In an example technique, the inverse transfer function of DAC and other opto-electronic devices is measured by using a known training signal sequence. For this technique to work effectively, stringent synchronization and large numbers of measurements are typically required to avoid detriments due to noise. To increase the measurement accuracy in the high frequency region, the training signal sequence may need special processing also.

Alternatively, a time domain adaptive or blind pre-equalization method can be a good solution. In fact, the liner equalizers used for polarization demultiplexing can be a good tool for channel estimation. Examples include algorithms such as constant modulus algorithm (CMA), multimodulus algorithm (MMA) or decision-directed least-mean-squares (DD-LMS). Transfer functions of these adaptive equalizers can be modeled with the inverse Jones matrices of the channel in reversed order. When the input signals are from the same polarization (single polarization signals), the frequency response of these adaptive equalizers is just the inverse transfer functions of the channel. Using this feature, one can simply get the inverse of channel transfer function for pre-equalization. In some DD-LMS implementations, a training sequence may be initially used for making symbol decisions at the receiver side, and is then replaced by previous symbol decisions after some time.

The techniques disclosed in the present document can be embodied in a scheme for bandwidth limited optical coherent system using DAC for signal generation. The pre-equalization is based on the blind and adaptive channel estimation using the DD-LMS algorithm. By using high speed, e.g., 64 GSa/s, DAC with pre-equalization, the system performance improvements are demonstrated by the results of 40-Gbuad PM-QPSK, PM-8QAM and PM-16QAM. The pre-equalization performances under different processing conditions are also disclosed.

Adaptive Pre-Equalization Based on DD-LMS

FIG. 1 depicts an optical communication system 100 in which the presently disclosed technology can be implemented. One or more optical transmitters 102 are communicatively coupled via an optical network 104 with one or more optical receivers 106. The optical network 104 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 1 for clarity.

To overcome the bandwidth-limitedness of the DAC and achieve a close to full bandwidth output signal, a variety of digital pre-equalization techniques can be used. All of them typically rely on a precise estimation of the optical channel. For example, a frequency-domain approach can be used to pre-equalize the linear band-limiting effects by measuring the joint inverse transfer function of DAC and other opto-electronic devices using a known training signal sequence. However, there are several disadvantages with conventional techniques, which are summarized as follows:

(1) It requires strict time alignment between the received and the known training symbols to accurately estimate the transfer function.

(2) A large amount of measurements for ensemble averaging are typically required to mitigate the received noise.

(3) In order to increase the measurement accuracy especially in the high-frequency region, the training signal sequence needs to be pre-emphasized to a certain extent.

(4) From the perspective of system implementation, such approach may not be easily utilized in current 100 G systems since an additional DSP (digital signal processing) block at the receiver needs to be developed to deal with the channel estimation, and using training sequence may increase redundancy, and therefore inefficiency, in the implementation.

The time-domain adaptive or blind pre-equalization method disclosed and demonstrated in this disclosure can be used to overcome these limitations, and others.

One embodiment simply records the FIR (Finite Impulse Response) tap coefficients at the output of those commonly-used linear equalizers (such as CMA, CMMA and DD-LMS equalizers) in the Rx DSP, and feeds back that information to the transmitter. This is because after the linear equalization, the impulse response consisting of a series of tap coefficients inherently represents the inversed channel. In comparison to such implementations, some embodiments of the disclosed technology, featuring no additional DSP, can be realized in practice without having to achieve precise symbol alignment, or conditions of low noise and high accuracy.

Figure 2:
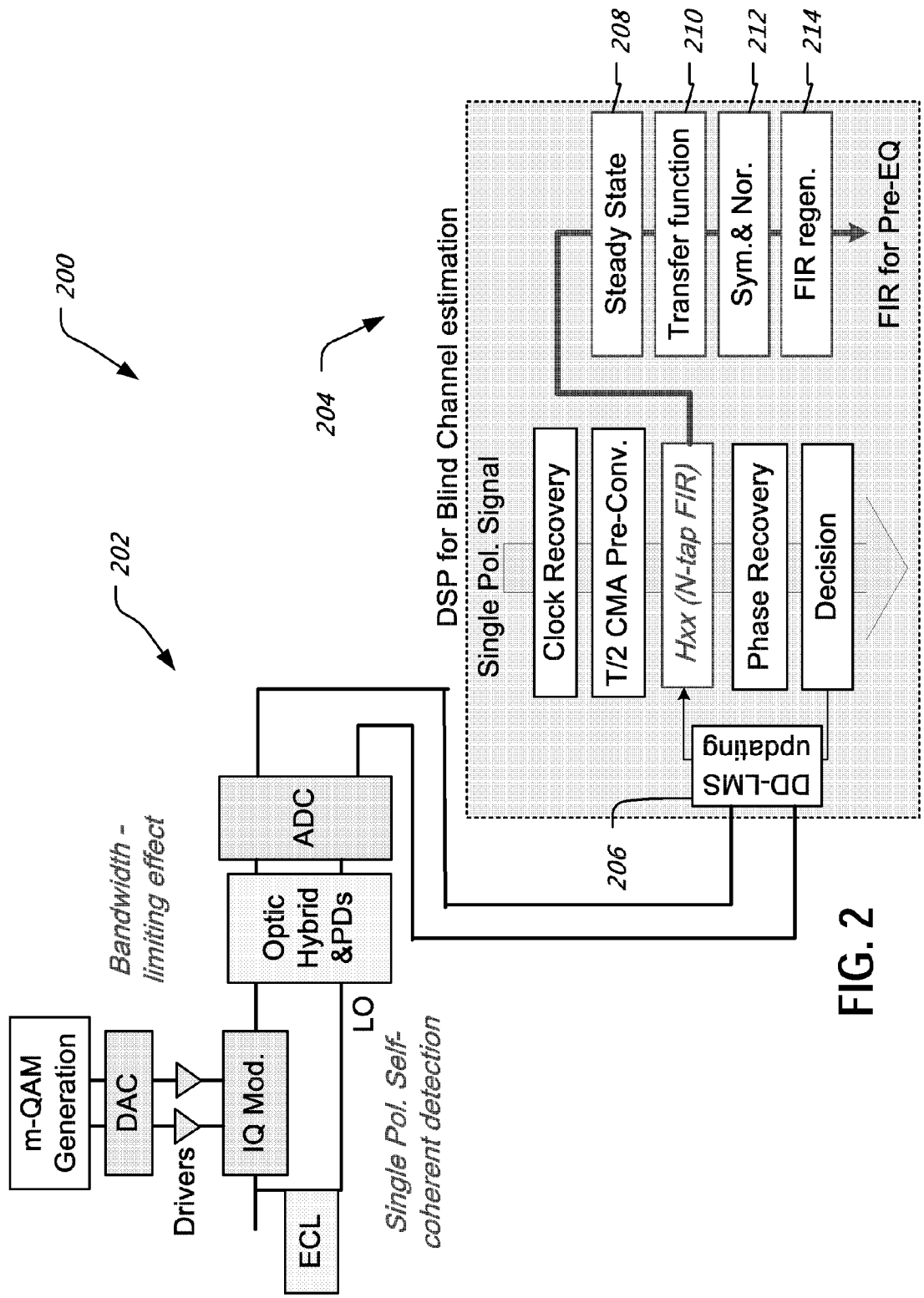
FIG. 2 depicts an example adaptive pre-equalization system based on DD-LMS.

FIG. 2 shows an example block diagram of an optical communication system 200 in which DD-LMS algorithm is used for pre-equalization (module 206). The transmitter-side 202 of the system 200 may first generate the mQAM data without pre-equalization as training sequence for channel estimation performed at the receiver-side 204.

In some embodiments, single polarization signal could be used in to avoid the polarization crosstalk. Alternatively, polarization multiplexing and demultiplexing can be used to increase data throughput.

In the depicted embodiment of FIG. 2, one CW lightwave ECL (continuous wave, external cavity laser) is used as both the signal source and the LO (Local Oscillator) source for the self-homodyne coherent detection.

In some embodiments, at the receiver-side 204, the received single polarized signal may be processed to recover the symbol clock and may be processed through a CMA pre-convergence module.

In some embodiments, the DD-LMS loop 206, may be implemented after CMA for pre-convergence, and may consists of four complex-valued, N-tap, FIR filters for signal equalization. The amplitude frequency response of these equalizers may closely approximate the inverse transfer function of the channel.

As shown in further detail in 208, 210, 212 and 214, after convergence, these FIR filters will achieve a steady state (208) at which the coefficients will not change significantly after processing additional received data. At 210, the inverse transfer functions can be calculated from the DD-LMS filters by applying a discrete Fourier transformation.

After normalization and frequency symmetrization (212), the time domain FIR for pre-equalization can be regenerated (214). In this way, the obtained FIR can be used for pre-equalization.

The system 200 uses a 64 GSa/s DAC to generate the mQAM data without pre-equalization as training sequence for channel estimation. In the described example, since the bandwidth limitation impairment is mainly caused by the DAC, electrical driver, the modulator and the ADC, only single polarization signal may be used to avoid the polarization crosstalk. However, polarization multiplexed signals can be used in practical equipment by correspondingly providing multiplexing equipment at the source side and a polarization demultiplexing filter at the receiver side. In the single polarization case, one CW lightwave ECL is used as both the signal source and the LO source for the self-homodyne coherent detection. In this case, the traditional post-equalization methods for polarization demultiplexing, such as DD-LMS, are actually the channel equalizers for the bandwidth limitation impairment. The amplitude frequency response of these equalizers is the inverse transfer function of the channel. Therefore, the filter computed during the DD-LMS decisions can be used for channel estimation.

The DD-LMS loop, which is after CMA for pre-convergence, consists of four complex-valued, N-tap, FIR filters for signal equalization. After convergence, these FIR filters achieved the steady state. The inverse transfer functions can be calculated from the DD-LMS filters by applying a discrete Fourier transformation. After normalization and frequency symmetrization, the time domain FIR for pre-equalization can be regenerated. In this way, the obtained FIR can be used for pre-equalization. Although the m-QAM data is used as training sequence, the receiver-side need not know the symbol information. The only information we use for the training sequence is the modulation formats. Therefore, this scheme is a blind and adaptive pre-equalization scheme.

Figure 3:
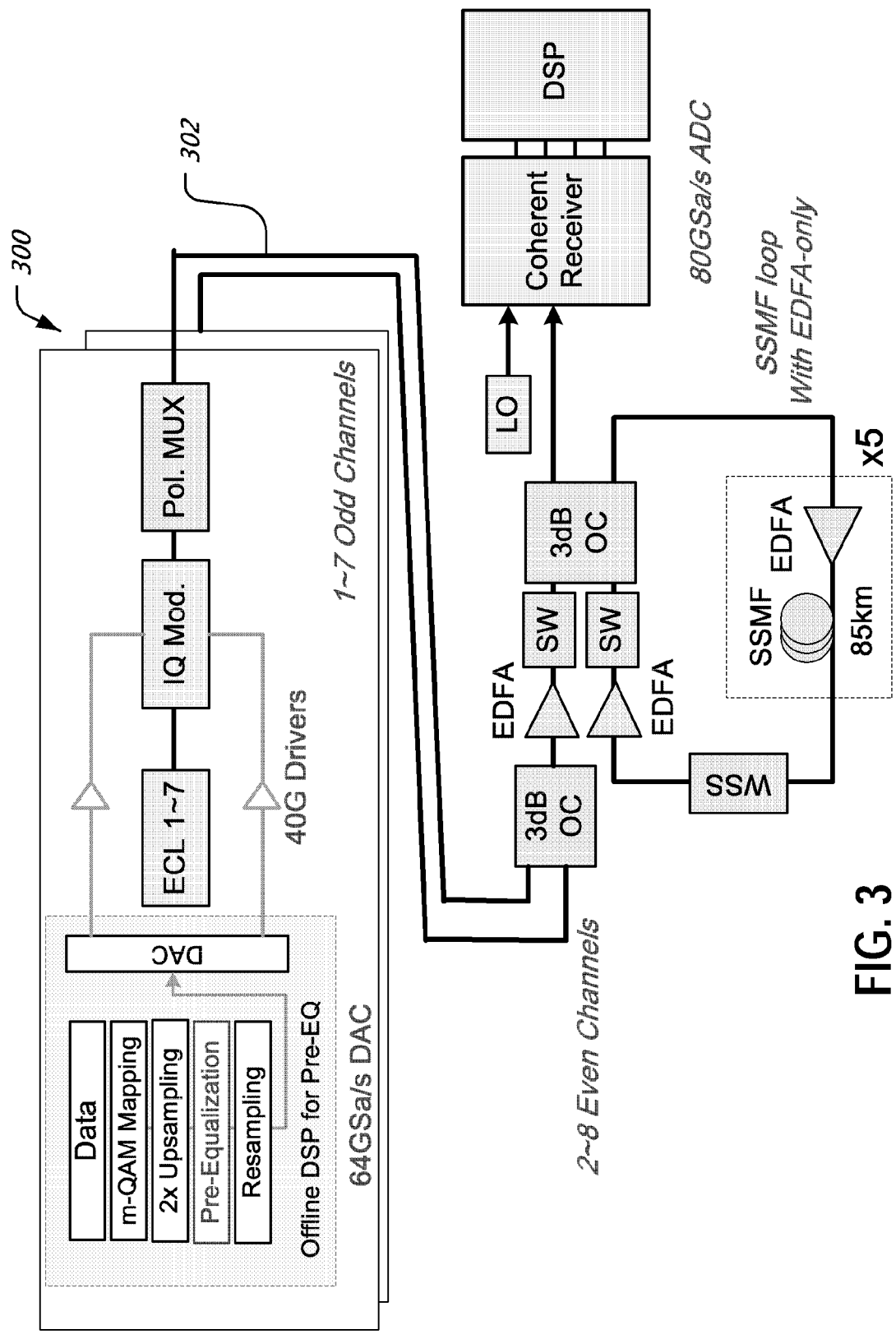
FIG. 3 depicts an example setup for the adaptive pre-equalization and the 8 channels 40-Gbaud QPSK/8QAM/16QAM WDM transmission.

FIG. 3 shows an exemplary setup 300 of the 40 Gbaud PM-QPSK/8QAM/16QAM generation based on high speed DAC with adaptive pre-equalization, transmission and coherent detection in a 50 GHz WDM grid. 8 tunable external cavity lasers (ECLs) ECL1 to ECL8 are used as 8 sub-channels in our system with the linewidth less than 100 kHz, the output power of 14.5 dBm and carrier-spacing of 50-GHz. The odd and even channels are implemented with two sets of polarization-maintaining optical couplers (PM-OCs) before the independent in-phase and quadrature (I/Q) modulation (signals 302). The 40 GBaud QPSK/8QAM/16QAM signals are generated by a 64 GSa/s DAC, in which the inphase (I) and quadrature (Q) data are generated by the Tx DSP blocks shown in FIG. 2.

After m-QAM (m=4/8/16) mapping for the transmitted data, the data is then up-sampled to 2 Sa/symbol. Then, a time domain pre-equalization is implemented to for the up-sampled data to compensate the bandwidth limitation impairment caused by the DAC, driver and I/Q modulator. At the coherent receiver, polarization and phase diversity coherent detection is employed. Here, the linewidth of ECL at the transmitter and LO at the receiver is both around 100 kHz. For performance measurement, the analog-to-digital conversion (ADC) can be realized in the digital oscilloscope with the sample rate of 80 GSa/s and 30-GHz bandwidth. In our case, the pre-equalization is implemented in time domain and the FIR is obtained by the adaptive scheme as shown in FIG. 1.

Figure 4B:
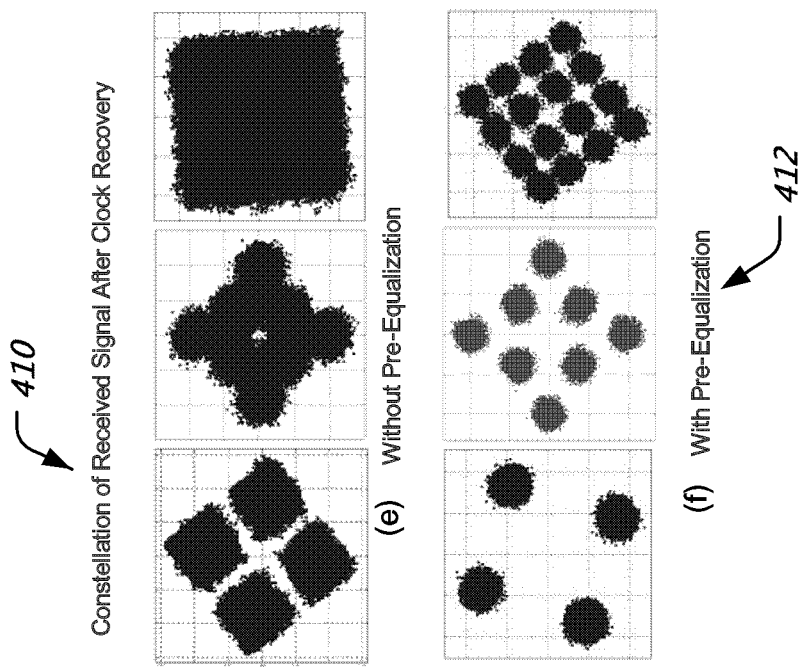
FIG. 4 shows example frequency responses of FIR before and after symmetrization, the FFT spectrum of DAC generated 8-QAM signal without and with pre-EQ, and the constellations of received signal without and with pre-EQ.
Figure 4A:
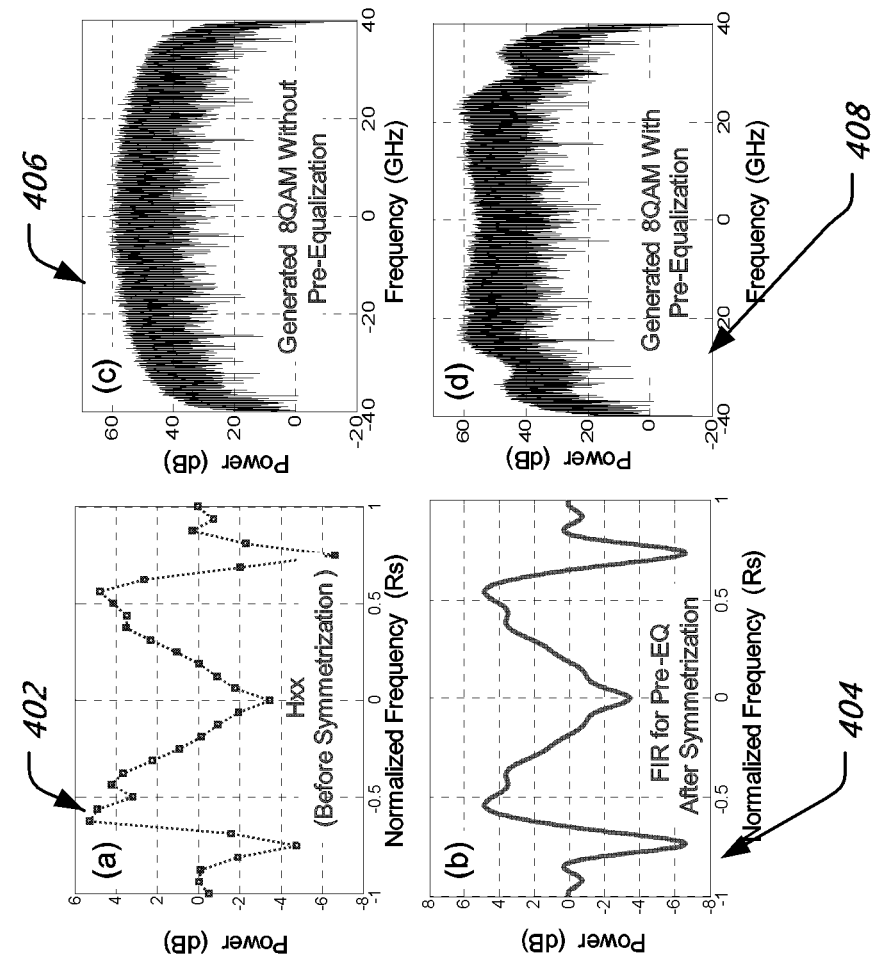

The results of channel estimation and pre-equalization are shown in FIGS. 4A and 4B. Here, a QPSK signal is used as the training data modulation format. Graph 402 shows the frequency response of DD-LMS 33 taps FIR filter Hxx, which indicates the inverse transfer functions of the channel. After symmetrization and FIR re-generation, the frequency response of FIR filter for pre-equalization is shown in graph 404. Due to the DD-LMS for signal recovery, only signal frequency components within 0.6 Rs are effectively pre-equalized. Graphs 406 and 408 show the FFT spectra of a 40 Gbaud 8QAM signals without and with pre-equalization. Higher frequency components within 0.6 Rs are enhanced against the bandwidth limitation impairments. Graphs 410 and 412 show the constellations of received single polarization 40 Gbaud QPSK/8QAM/16QAM signal after clock recovery without and with pre-equalization. It can be seen that, clear constellations can be obtained with pre-equalization even before the CMA adaptive equalizer.

Figure 5:
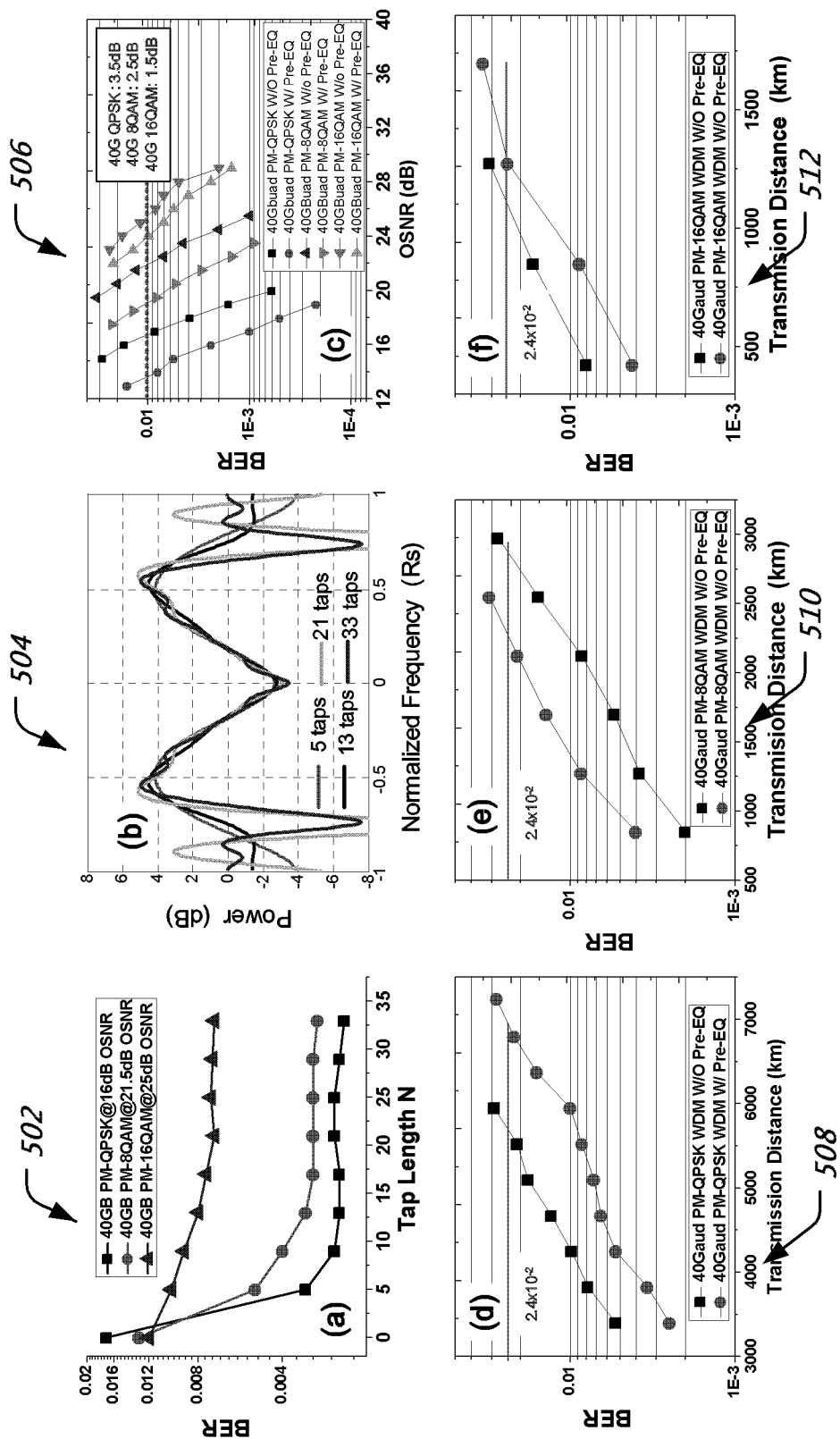
FIG. 5 depicts example results, including (a) the BER (bit error rate) vs. the taps length; (b) FIR (finite impulse response) filter response under different tap length; (c) BTB (back to back) BER vs. OSNR; (d)~(f) BER of 8 channels WDM vs. Transmission distance.

FIG. 5, graph 502 shows the experiment results of BTB BER results of 40 Gbaud QPSK/8QAM/16QAM with adaptive pre-equalization versus the tap length N of Hxx used in DD-LMS. QPSK is chosen as the training data modulation format. We can see that, QPSK is less sensitive to the tap length and 9 taps is enough for pre-equalization. However, higher modulation formats 8QAM and 16QAM needs more taps for pre-equalization. The frequency response of the FIR under different tap length is shown in graph 504. It can be seen that the response of higher frequency is different. The BER results versus the OSNR with and without pre-equalization is of 40 Gbaud PM-QPSK/8QAM/16QAM are shown in graph 506. About 3.5 dB, 2.5 dB and 1.5 dB OSNR improvement can be obtained by using pre-equalization for the 40 Gbaud PM-QPSK/8QAM/16QAM signals. The transmission performance improvements for these signals are also demonstrated by the increased transmission distance measured of these signals as shown in FIG. 5, graphs 508, 510 and 512.

In some embodiments, an adaptive pre-equalization scheme for bandwidth limited optical coherent system using DAC for signal generation.

The pre-equalization is based on the blind and adaptive channel estimation using the DD-LMS algorithm.

Although the m-QAM data is used as training sequence, symbol information knowledge is not required. The only information used for the training sequence is the modulation formats. It is a blind and adaptive method.

Figure 6:
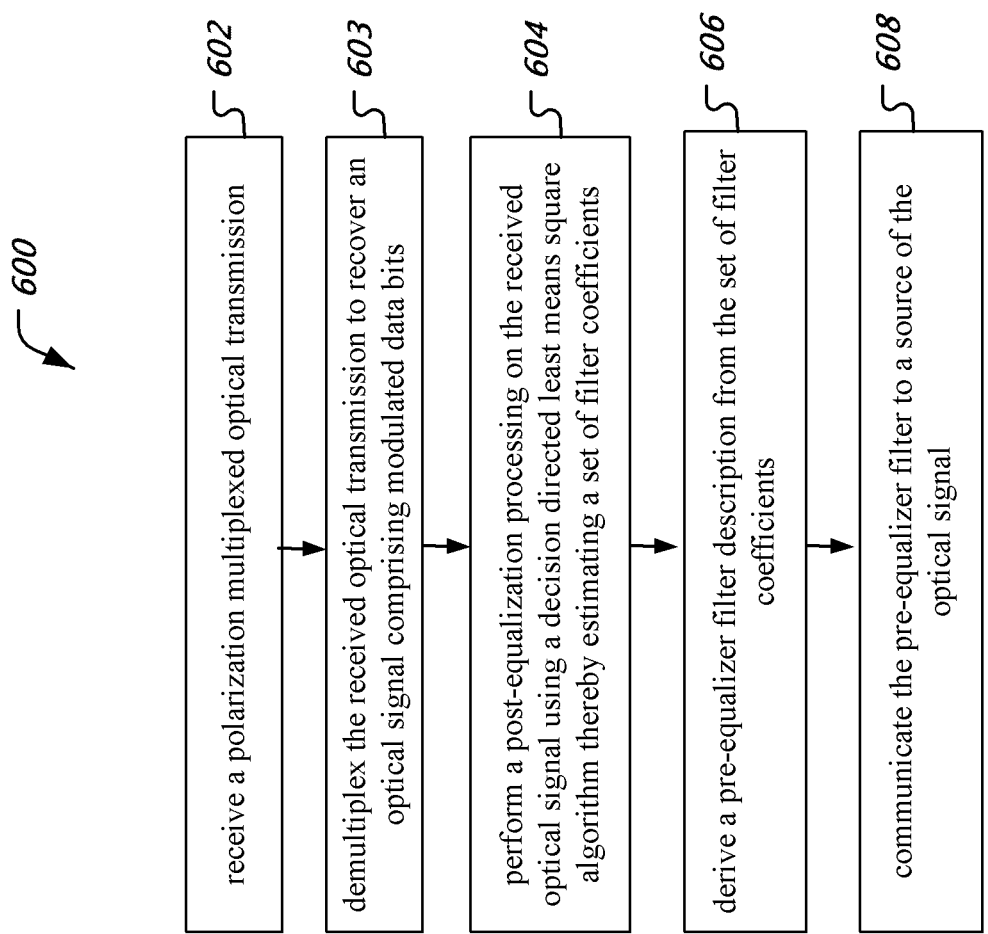
FIG. 6 is a flowchart representation of an exemplary method of digital communication.

FIG. 6 is a flowchart representation of a method 600 of optical communication. The method 600 may be implemented at a receiver-side in an optical communication network (e.g., receiver electronics in equipment 102 and 106).

At 602, the method 600 receives a polarization multiplexed optical transmission. For example, in some embodiments, two polarization multiplexed optical signals (along two orthogonal optical planes) may be received. The signals may be, e.g., signals 302, depicted in FIG. 3.

At 603, the method 600 demultiplexes the received optical transmission to recover an optical signal comprising modulated data bits. For example, the demultiplexing may include the various signal processing modules and techniques depicted and discussed with respect to FIG. 2, e.g., clock recovery, T/2 CMA pre-convergence, N-Tap filter estimation, phase recovery and symbol decisions to extract the modulated data bits.

At 604, the method 600 performs a post-equalization processing on the received optical signal using a decision directed least means square algorithm thereby estimating a set of filter coefficients representative of a communication channel over which the optical signal is received. The post-equalization processing may include, e.g., different processing operations described with respect to FIG. 2 and FIG. 3.

At 606, the method 600 derives a pre-equalizer filter description from the set of filter coefficients. In some implementations, the derivation of the pre-equalizer may include monitoring for the estimation of the set of filter coefficients operation to reach a steady state. After the estimation has reached the steady state, then the method 600 may compute a transfer function, symmetrize and normalize the transfer function, and generate the pre-equalizer filter description from the symmetrized and normalized transfer function. In some embodiments, the estimation is considered to have reached a steady state based on comparing an error of an iteration of the estimation against a predetermined convergence threshold value, and deciding that the estimation has reached the steady state when the error is less than or equal to the predetermined convergence threshold value.

At 608, the method 600 communicates the pre-equalizer filter to a source of the optical signal. In some embodiments, the method 600 computes the pre-equalizer filter without having to perform digital to analog conversion (DAC) at the receiver side to estimate the pre-equalization transfer function.

Figure 7:
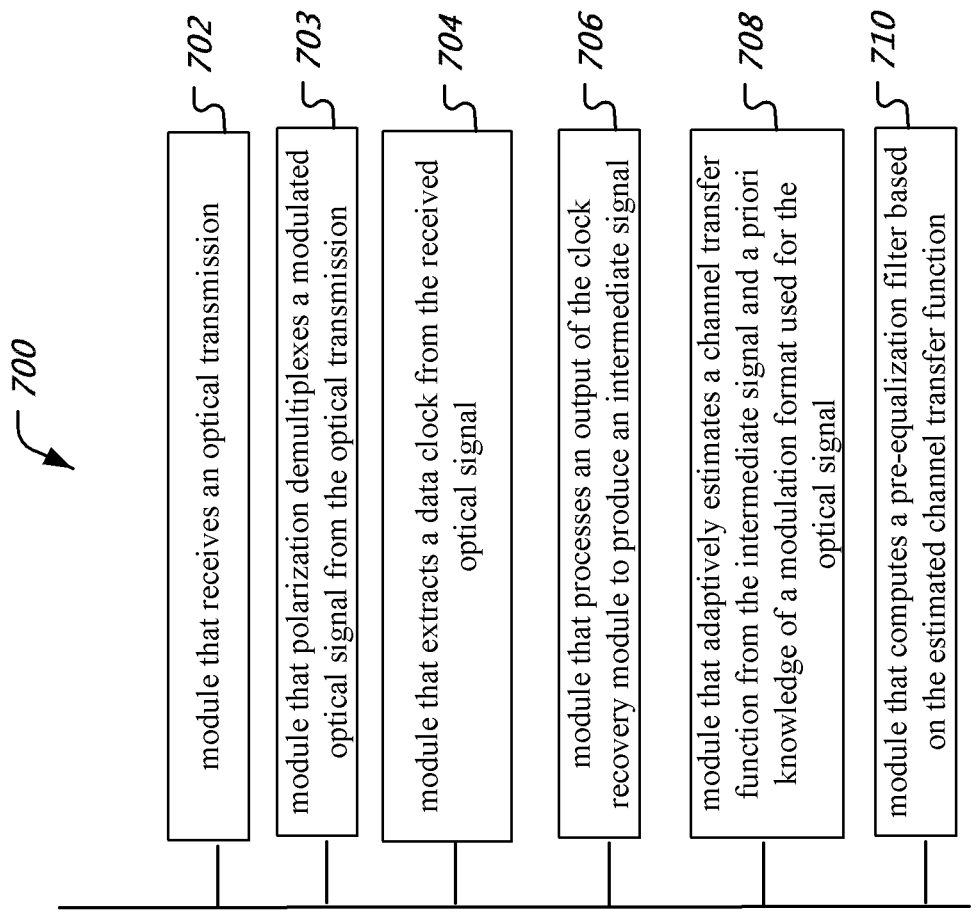
FIG. 7 is a block diagram representation of an exemplary digital communication apparatus.

FIG. 7 is a block diagram representation of an exemplary optical communication receiver 700. The module 702 (e.g., a receiver module) is for receiving an optical transmission. The polarization demultiplexer module 703 is for polarization demultiplexing a modulated optical signal from the optical transmission. The module 704 (e.g., a clock recovery module) is for extracting a data clock from the received optical signal. The module 706 (e.g., a pre-convergence module) is for processing an output of the clock recovery module to produce an intermediate signal. The module 708 (e.g., a decision directed updating module) is for adaptively estimating a channel transfer function from the intermediate signal and a priori knowledge of a modulation format used for the optical signal. The module 710 (e.g., a pre-equalizer module) is for computing a pre-equalization filter based on the estimated channel transfer function. In various embodiments, the apparatus 700 and modules 702, 704, 706, 708 and 710 may perform additional operations disclosed in the present document.

In some embodiments, an optical communication system includes an optical transmitter, an optical receiver and an optical communication medium (e.g., optical fibre) that is communicatively coupled to the optical transmitter and the optical receiver.

The optical transmitter filters a training sequence comprising a plurality of Quadrature Amplitude Modulation (QAM) symbols through a pre-equalizer filter and polarization domain multiplexes the filtered training sequence with other optical signals to generate an optical transmission.

The optical receiver demultiplexes the training sequence from the optical transmission, performs a post-equalization processing on the received training sequence using a decision directed least means square algorithm thereby estimating a set of filter coefficients representative of a communication channel over which the training sequence is received, derive a pre-equalizer filter description from the set of filter coefficients, and communicates an update to the pre-equalizer filter to the optical transmitter.

In some embodiments, an optical communication, e.g., as depicted in FIG. 1, includes an optical transmitter and an optical receiver. The optical transmitter filters a training sequence comprising a plurality of Quadrature Amplitude Modulation (QAM) symbols through a pre-equalizer filter and polarization domain multiplexes the filtered training sequence with other optical signals to generate an optical transmission. The optical receiver demultiplexes the training sequence from the optical transmission, performs a post-equalization processing on the received training sequence using a decision directed least means square algorithm thereby estimating a set of filter coefficients representative of a communication channel over which the training sequence is received. derives a pre-equalizer filter description from the set of filter coefficients, and communicates an update to the pre-equalizer filter to the optical transmitter.

It will be appreciated that techniques for performing adaptive pre-equalization of optical signals are disclosed. The pre-equalization at a transmitter-side may be performed using updates to the pre-equalizer filter to be used, received from the receiver side. At the receiver, an already existing module that performs channel estimation, e.g., a DD-LMS module, may be used to also generate pre-equalizer filters.

It will further be appreciated that the disclosed techniques can be used to improve communication performance (e.g., bit error rate and throughput of transmission), without having to comprise performance due to bandwidth limitations in digital to analog conversion.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of optical communication, implementable at a receiver-side in an optical communication network, comprising:
   receiving a polarization multiplexed optical transmission;
   demultiplexing the received optical transmission to recover an optical signal comprising modulated data bits;
   performing a post-equalization processing on the received optical signal using a decision directed least means square algorithm thereby estimating a set of filter coefficients representative of a communication channel over which the optical signal is received;
   deriving a pre-equalizer filter description from the set of filter coefficients; and
   communicating the pre-equalizer filter to a source of the optical signal.

2. The method of claim 1, wherein the deriving the pre-equalizer filter description includes:
   monitoring for the estimation of the set of filter coefficients operation to reach a steady state; and
   after the estimation has reached the steady state:
   computing a transfer function;
   symmetrizing and normalizing the transfer function; and
   generating the pre-equalizer filter description from the symmetrized and normalized transfer function.

3. The method of claim 2, wherein the monitoring for the estimation to reach the steady state comprises:
   comparing an error of an iteration of the estimation against a predetermined convergence threshold value, and deciding that the estimation has reached the steady state when the error is less than or equal to the predetermined convergence threshold value.

4. The method of claim 2, wherein the symmetrization operation includes:
   converting complex valued coefficients of the transfer function to real value coefficients by assuming an even symmetry of the transfer function.

5. An optical receiver apparatus, comprising:
   a receiver module that receives an optical transmission;
   a polarization demultiplexer module that polarization demultiplexes a modulated optical signal from the optical transmission;
   a clock recovery module that extracts a data clock from the modulated optical signal;
   a pre-convergence module that processes an output of the clock recovery module to produce an intermediate signal;
   a decision directed updating module that adaptively estimates a channel transfer function from the intermediate signal and a priori knowledge of a modulation format used for modulated optical signal; and
   a pre-equalizer module that computes a pre-equalization filter based on the estimated channel transfer function.

6. The apparatus of claim 5, wherein the deriving the pre-equalizer module includes:
   a monitoring module that monitors the estimation of the set of filter coefficients operation to reach a steady state; and
   symmetrizing and normalizing module that symmetrizes and normalizes the channel transfer function.

7. The apparatus of claim 6, wherein the monitoring module includes:
   an error comparison module that compares an error of an iteration of the estimation against a predetermined convergence threshold value, and deciding that the estimation has reached the steady state when the error is less than or equal to the predetermined convergence threshold value.

8. The apparatus of claim 6, wherein the symmetrization operation includes:
   converting complex valued coefficients of the transfer function to real value coefficients by assuming an even symmetry of the transfer function.

9. An optical receiver, comprising:
   a memory; and
   a processor, wherein the memory stores code for an optical communication method and the processor read the code from the memory and implements the optical communication method, the method comprising:
   receiving a polarization multiplexed optical transmission;
   demultiplexing the received optical transmission to recover an optical signal comprising modulated data bits;
   performing a post-equalization processing on the received optical signal using a decision directed least means square algorithm thereby estimating a set of filter coefficients representative of a communication channel over which the optical signal is received;
   deriving a pre-equalizer filter description from the set of filter coefficients; and
   communicating the pre-equalizer filter to a source of the optical signal.

10. The optical receiver of claim 9, wherein the deriving the pre-equalizer filter description includes:
    monitoring for the estimation of the set of filter coefficients operation to reach a steady state; and
    after the estimation has reached the steady state:
    computing a transfer function;
    symmetrizing and normalizing the transfer function; and
    generating the pre-equalizer filter description from the symmetrized and normalized transfer function.

11. The optical receiver of claim 10, wherein the monitoring for the estimation to reach the steady state comprises:
    comparing an error of an iteration of the estimation against a predetermined convergence threshold value, and deciding that the estimation has reached the steady state when the error is less than or equal to the predetermined convergence threshold value.

12. The optical receiver of claim 10, wherein the symmetrizing includes:
converting complex valued coefficients of the transfer function to real value coefficients by assuming an even symmetry of the transfer function.

13. An optical communication system, comprising:
an optical transmitter that filters a training sequence comprising a plurality of Quadrature Amplitude Modulation (QAM) symbols through a pre-equalizer filter and polarization domain multiplexes the filtered training sequence with other optical signals to generate an optical transmission;
an optical receiver that:
demultiplexes the training sequence from the optical transmission;
performs a post-equalization processing on the received training sequence using a decision directed least means square algorithm thereby estimating a set of filter coefficients representative of a communication channel over which the training sequence is received;
derives a pre-equalizer filter description from the set of filter coefficients; and
communicates an update to the pre-equalizer filter to the optical transmitter.

14. The optical communication system of claim 13, wherein the optical transmitter receives the update to the pre-equalizer filter and pre-equalizes subsequent data transmissions using the updated pre-equalizer filter.

15. The optical communication system of claim 13, wherein the optical receiver derives the pre-equalization filter by monitoring for the estimation of the set of filter coefficients operation to reach a steady state, and after the estimation has reached the steady state, by computing a transfer function, symmetrizing and normalizing the transfer function, and generating the pre-equalizer filter description from the symmetrized and normalized transfer function.

* * * * *